United States Patent
Abrahamian et al.

(10) Patent No.: US 12,430,313 B2
(45) Date of Patent: Sep. 30, 2025

(54) DISAMBIGUATION OF FEATURE GRAPH DATABASES

(71) Applicant: AT&T Intellectual Property I, L.P., Atlanta, GA (US)

(72) Inventors: Edmond J. Abrahamian, Richmond Heights, MO (US); Ana Armenta, San Jose, CA (US); Andrew Campbell, Pleasant Hill, CA (US); Jean Luo, Millbrae, CA (US); Elijah Hall, Plano, TX (US); Prince Paulraj, Coppell, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 17/959,528

(22) Filed: Oct. 4, 2022

(65) Prior Publication Data
US 2024/0111750 A1  Apr. 4, 2024

(51) Int. Cl.
*G06F 16/30* (2019.01)
*G06F 16/23* (2019.01)

(52) U.S. Cl.
CPC .................. *G06F 16/23* (2019.01)

(58) Field of Classification Search
CPC ....................................................... G06F 16/23
See application file for complete search history.

(56) References Cited

U.S. PATENT DOCUMENTS

| | | | | |
|---|---|---|---|---|
| 2014/0280147 | A1* | 9/2014 | Arabshian | G06F 16/367 707/737 |
| 2019/0129959 | A1* | 5/2019 | Jagwani | G06F 16/217 |
| 2020/0372057 | A1* | 11/2020 | Tonkin | G06F 16/211 |
| 2022/0164714 | A1* | 5/2022 | Hron, II | G06F 40/279 |
| 2023/0030086 | A1* | 2/2023 | Martinez Ayala | G06F 16/3335 |
| 2023/0031135 | A1* | 2/2023 | Cartella | G06N 20/00 |

OTHER PUBLICATIONS

Riskspan, "Making Data Dictionaries Beautiful Using Graph Databases", Jun. 18, 2018, downloaded from https://riskspan.com/graphs-for-data-management/, 7 pages.
Planetary Data System, "Data Dictionary Search", accessed on Aug. 1, 2022 from https://pds.nasa.gov/tools/dd-search/, 4 pages.
Kasenchak B., et al., "Introduction to Ontology Concepts and Modeling", Content Strategy, Foundational Thinking, Information Architecture, Boxes and Arrows, Nov. 2, 2021, 19 pages.
"Ontology Components", Wikipedia, accessed on Jul. 24, 2022, 6 pages.
Tripathi, A., "Understanding Ontologies and Knowledge Graphs", Mar. 27, 2021, 8 pages.
Data Dictionary.csv, Southeast Fisheries Science Center (SERCO), Aug. 9, 2022, accessed from https://www.fisheries.noaa.gov/inport/item/33849, 6 pages.

* cited by examiner

*Primary Examiner* — Khanh B Pham

(57) ABSTRACT

A processing system may obtain a request to add at least a first feature to a feature graph database, where the request comprises a first feature ontology of the first feature, and where the first feature ontology comprises: a label of the first feature and a relationship of the first feature to a concept or to another feature. The processing system may then identify whether the first feature is a duplicate of a second feature in the feature graph database based at least upon the first feature ontology and a second feature ontology of the second feature and generate an indication of whether the first feature is a duplicate in response to the identifying.

19 Claims, 5 Drawing Sheets

FEATURE SET 200
(TO ADD TO FEATURE GRAPH)

| FEATURE SET NAME | FEATURE | CONCEPT | RECIPE |
|---|---|---|---|
| SAMPLE S1 | Model type | Product | PhoneHasModelType; PhoneIsDevice |
| SAMPLE S1 | Manufacturer | Product | DeviceIsManufacturedByManufacturer |
| SAMPLE S1 | Billing_AccountNumber | Account | AccountHasBillingAccountNumber |
| SAMPLE S1 | Payment type | Payment | PaymentTransactionHasPaymentType |
| SAMPLE S1 | Price | Product; Payment | PhoneHasPrice |
| SAMPLE S1 | State | Credit application | CreditApplicationWasFiledInState |
| ... | ... | ... | ... |

CORRECTED LABEL: BAN

CORRECTED FEATURE ONTOLOGY/RECIPE: ProductHasPrice

CORRECTED FEATURE ONTOLOGY/RECIPE: AccountHasBAN

FIG. 2

DISAMBIGUATION OF FEATURE GRAPH DATABASES

The present disclosure relates generally to telecommunication network database records management and utilization, and more particularly to methods, computer-readable media, and apparatuses for identifying whether a first feature to be added to a feature graph database is a duplicate of a second feature in the feature graph database based at least upon a first feature ontology of the first feature and a second feature ontology of the second feature.

BRIEF DESCRIPTION OF THE DRAWINGS

The present disclosure can be readily understood by considering the following detailed description in conjunction with the accompanying drawings, in which:

FIG. 2 illustrates an example of a feature set to be added to a feature store, in accordance with the present disclosure;

To facilitate understanding, identical reference numerals have been used, where possible, to designate identical elements that are common to the figures.

DETAILED DESCRIPTION

Figure 1:
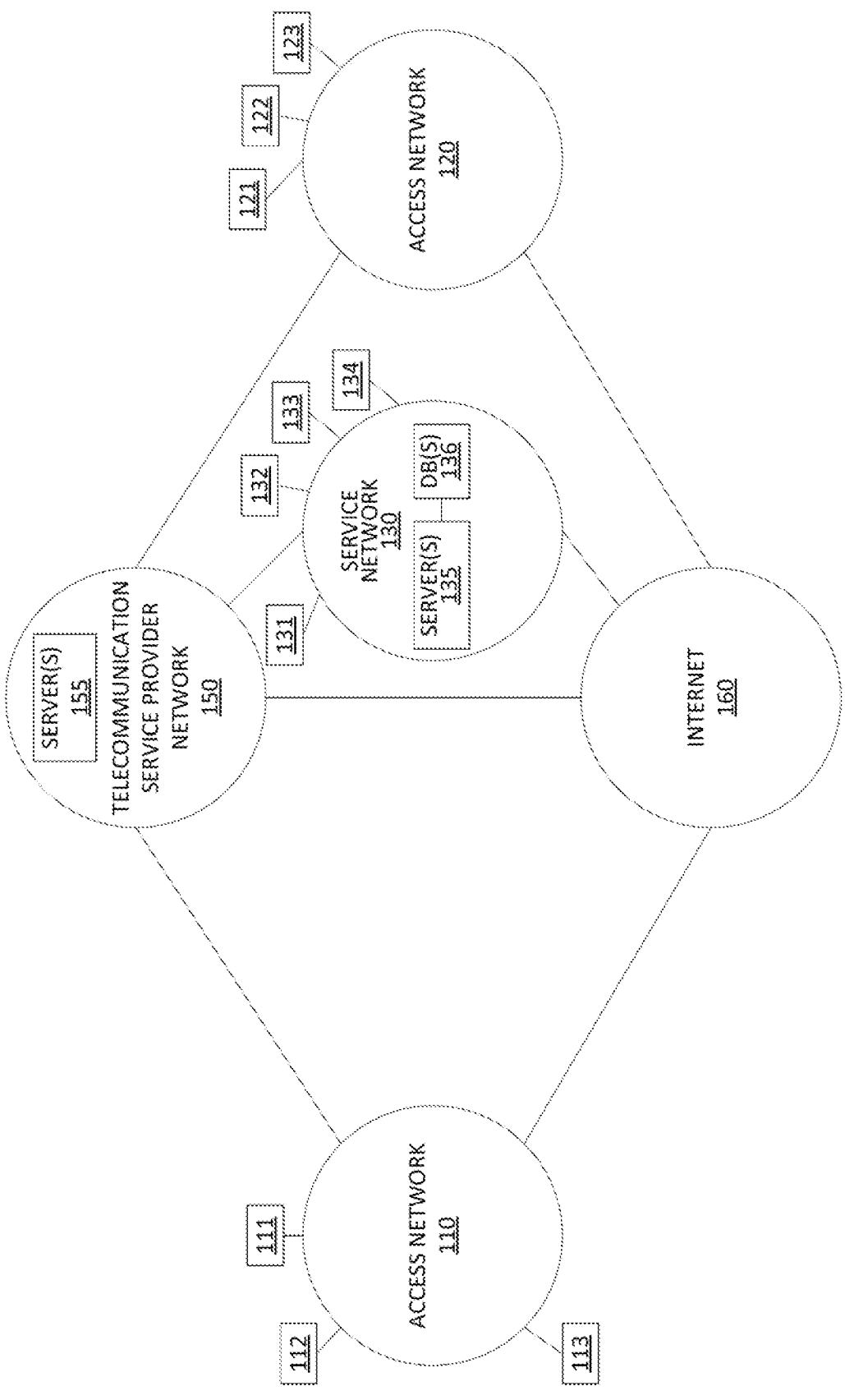
FIG. 1 illustrates one example of a system including a telecommunication network, according to the present disclosure.

The present disclosure broadly discloses methods, non-transitory (i.e., tangible or physical) computer-readable media, and apparatuses for identifying whether a first feature to be added to a feature graph database is a duplicate of a second feature in the feature graph database based at least upon a first feature ontology of the first feature and a second feature ontology of the second feature. For instance, in one example, a processing system including at least one processor may obtain a request to add at least a first feature to a feature graph database, where the request comprises a first feature ontology of the first feature, and where the first feature ontology comprises: a label of the first feature and a relationship of the first feature to a concept or to another feature. The processing system may then identify whether the first feature is a duplicate of a second feature in the feature graph database based at least upon the first feature ontology and a second feature ontology of the second feature and generate an indication of whether the first feature is a duplicate in response to the identifying.

In accordance with the present disclosure, a feature store may comprise a data storage system, e.g., a "data warehouse," for features (also known as descriptors) that can be used for various purposes, such as for training machine learning models. Increased interest in feature stores stems at least in part from their ability to provide easy access to vast numbers of features to be shared among data scientists, engineers, and architects when orchestrating machine learning flows. However, this same functionality can become unwieldy if features were to be added indiscriminately.

In one example, the present disclosure disambiguates features such that duplicate features that differ in name only are not added to a feature store. Alternatively, or in addition, the present disclosure may identify features that come from the same source(s) and/or that are complementary subsets of data of a same feature. In one example, the present disclosure applies a three-pronged approach to identify datasets that contain features coming from sources already available in the feature store. First, a user entering a feature into the feature store can declare the lineage of the feature using a lineage service. Although not required, when lineage information is provided, a lineage trace-back can reveal information about potential duplicates. Second, the feature store may keep track of a complete ontology for features in a feature graph database or "feature graph." For instance, the feature graph database may comprise an "ontology graph" that depicts both lineage and nomenclature. When introducing a new feature, checks are made that it does not fall within an existing ontological entry (otherwise this implies that it is a duplicate). Third, when features are introduced into the feature store, the features may be associated with time blocks, or time ranges. A fingerprint service may compute a fingerprint for feature data that is in a prescribed time range. For example, fingerprints may include multiple aspects of information about a feature (e.g., a table column), such as high values, low values, mean values, median values, entropy metrics, uniqueness factors, etc. In one example, fingerprints may include feature information computed by a choice of one or more techniques, including but not limited to statistical methods, for example T-tests, Kolmogorov-Smirnov test for numeric types, Tversky index for string types, time series sampling, etc. In any case, fingerprints for new proposed features can be compared with those already in the feature store to identify potential duplicates. For instance, the comparison may be quantified via calculation of a distance metric (e.g., a similarity and/or different metric) between the fingerprints. For instance, respective fingerprints may be considered vectors from which a cosine distance or the like may be calculated. In one example, a machine learning model may be trained to output a feature similarity value (or feature difference value) based on the respective fingerprints. For instance, a machine learning model may learn weights to apply to difference values between corresponding fingerprint information elements in respective fingerprints (fingerprint vectors) to calculate an overall distance metric (or similarly metric). In one example, the fingerprinting check may work in conjunction with the ontology check, e.g., in parallel or following an ontology check to confirm whether a new feature is or is not a duplicate of an existing feature.

Features may be introduced primarily as part of a feature set, which may comprise multiple features that may come from different sources. For instance, a feature may comprise a table column. When a feature set is added, the contributor may not be aware of the scope of features of other feature sets. The present disclosure allows for the feature store to scan the available features and determine which ones are likely to be related based on having the same or similar ontologies. In various examples, the present disclosure may further identify likely related features (or unrelated features) based on feature names, timestamps and/or fingerprints. For example, a feature ontology resolution module may work in conjunction with a feature similarly module to more accurately identify likely duplicates (or non-duplicates). In one example, a user may provide feedback based on recommended similar features to validate whether the two features are in fact the same, not the same, derived or otherwise related, and so forth. As such, examples of the present disclosure provide an improved feature store and improved feature graph database/ontological database that avoids duplication, reduces processing time and resource waste, reduces storage requirements, and improves feature discoverability by identifying similar (e.g., but not identical) features.

With respect to telecommunication network operations, the proliferation of Internet of Things devices, higher data rates on fiber-optic cable, and the expansion of 5G and other network technologies may increase the need for accurate network inventory data while at the same time making this task even more challenging. Although examples of the present disclosure are described herein primarily in connection with telecommunication network inventory and operations, examples of the present disclosure may be further applicable to other systems having large inventories, systems that utilize substantial automated processes, and so forth. For instance, this may include utility systems (e.g., electric power utilities, water services, sanitary/sewerage services, natural gas services, and so forth), city management and operational systems (e.g., a large city may operate hundreds of subway cars, may maintain thousands of miles of track, switching equipment, etc., may maintain a network of traffic lights and other traffic signals, street lights, "smart city" sensors, etc.), organizations with large numbers of customer/account records (e.g., major online retailers, etc.), and so forth.

It should be noted that the three-pronged approach described herein allows for flexibility for users to define their requirements either for production or experimental tasks. While leveraging the ontological mappings defined by the features store, the fingerprint engine can map two features that are not linked by the user explicitly and create weighted connections that the user can filter on as needed. As data is updated, the feature store may reevaluate these connections and similarities. With these recommendation and user feedback, the ontological mappings comprise a dynamic graph that is continuously updated and improved over time and with more user interactions with the feature store. Examples of the present disclosure may also be combined with other data cleansing and exploration methods to achieve an even higher degree of accuracy. These and other aspects of the present disclosure are described in greater detail below in connection with the examples of FIGS. 1-5.

To aid in understanding the present disclosure, FIG. 1 illustrates an example system 100 comprising a plurality of different networks in which examples of the present disclosure may operate. Telecommunication service provider network 150 may comprise a core network with components for telephone services, Internet services, and/or television services (e.g., triple-play services, etc.) that are provided to customers (broadly "subscribers"), and to peer networks. In one example, telecommunication service provider network 150 may combine core network components of a cellular network with components of a triple-play service network. For example, telecommunication service provider network 150 may functionally comprise a fixed-mobile convergence (FMC) network, e.g., an IP Multimedia Subsystem (IMS) network. In addition, telecommunication service provider network 150 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VoIP) telephony services. Telecommunication service provider network 150 may also further comprise a broadcast television network, e.g., a traditional cable provider network or an Internet Protocol Television (IPTV) network, as well as an Internet Service Provider (ISP) network. With respect to television service provider functions, telecommunication service provider network 150 may include one or more television servers for the delivery of television content, e.g., a broadcast server, a cable head-end, a video-on-demand (VoD) server, and so forth. For example, telecommunication service provider network 150 may comprise a video super hub office, a video hub office and/or a service office/central office.

In one example, telecommunication service provider network 150 may also include one or more servers 155. In one example, the servers 155 may each comprise a computing device or processing system, such as computing system 500 depicted in FIG. 5, and may be configured to host one or more centralized and/or distributed system components. For example, a first system component may comprise a database of assigned telephone numbers, a second system component may comprise a database of basic customer account information for all or a portion of the customers/subscribers of the telecommunication service provider network 150, a third system component may comprise a cellular network service home location register (HLR), e.g., with current serving base station information of various subscribers, and so forth. Other system components may include a Simple Network Management Protocol (SNMP) trap, or the like, a billing system, a customer relationship management (CRM) system, a trouble ticket system, an inventory system (IS), an ordering system, an enterprise reporting system (ERS), an account object (AO) database system, and so forth. In addition, other system components may include, for example, a layer 3 router, a short message service (SMS) server, a voicemail server, a video-on-demand server, a server for network traffic analysis, and so forth. It should be noted that in one example, a system component may be hosted on a single server, while in another example, a system component may be hosted on multiple servers in a same or in different data centers or the like, e.g., in a distributed manner. For ease of illustration, various components of telecommunication service provider network 150 are omitted from FIG. 1.

In one example, access networks 110 and 120 may each comprise a Digital Subscriber Line (DSL) network, a broadband cable access network, a Local Area Network (LAN), a cellular or wireless access network, and the like. For example, access networks 110 and 120 may transmit and receive communications between endpoint devices 111-113, endpoint devices 121-123, and service network 130, and between telecommunication service provider network 150 and endpoint devices 111-113 and 121-123 relating to voice telephone calls, communications with web servers via the Internet 160, and so forth. Access networks 110 and 120 may also transmit and receive communications between endpoint devices 111-113, 121-123 and other networks and devices via Internet 160. For example, one or both of the access networks 110 and 120 may comprise an ISP network, such that endpoint devices 111-113 and/or 121-123 may communicate over the Internet 160, without involvement of the telecommunication service provider network 150. Endpoint devices 111-113 and 121-123 may each comprise a telephone, e.g., for analog or digital telephony, a mobile device, such as a cellular smart phone, a laptop, a tablet computer, etc., a router, a gateway, a desktop computer, a plurality or cluster of such devices, a television (TV), e.g., a "smart" TV, a set-top box (STB), and the like. In one example, any one or more of endpoint devices 111-113 and 121-123 may represent one or more user/subscriber devices. In addition, in one example, any of the endpoint devices 111-113 and 121-123 may comprise a device of an end-user (e.g., of an abstract data visualization service, as referred to herein).

In one example, the access networks 110 and 120 may be different types of access networks. In another example, the access networks 110 and 120 may be the same type of access network. In one example, one or more of the access networks 110 and 120 may be operated by the same or a different service provider from a service provider operating the telecommunication service provider network 150. For example, each of the access networks 110 and 120 may comprise an Internet service provider (ISP) network, a cable access network, and so forth. In another example, each of the access networks 110 and 120 may comprise a cellular access network, implementing such technologies as: global system for mobile communication (GSM), e.g., a base station subsystem (BSS), GSM enhanced data rates for global evolution (EDGE) radio access network (GERAN), or a UMTS terrestrial radio access network (UTRAN) network, among others, where telecommunication service provider network 150 may comprise a public land mobile network (PLMN)-universal mobile telecommunications system (UMTS)/General Packet Radio Service (GPRS) core network, or the like. In still another example, access networks 110 and 120 may each comprise a home network or enterprise network, which may include a gateway to receive data associated with different types of media, e.g., television, phone, and Internet, and to separate these communications for the appropriate devices. For example, data communications, e.g., Internet Protocol (IP) based communications may be sent to and received from a router in one of the access networks 110 or 120, which receives data from and sends data to the endpoint devices 111-113 and 121-123, respectively.

In this regard, it should be noted that in some examples, endpoint devices 111-113 and 121-123 may connect to access networks 110 and 120 via one or more intermediate devices, such as a home gateway and router, an Internet Protocol private branch exchange (IPPBX), and so forth, e.g., where access networks 110 and 120 comprise cellular access networks, ISPs and the like, while in another example, endpoint devices 111-113 and 121-123 may connect directly to access networks 110 and 120, e.g., where access networks 110 and 120 may comprise local area networks (LANs), enterprise networks, and/or home networks, and the like.

In one example, the service network 130 may comprise a local area network (LAN), or a distributed network connected through permanent virtual circuits (PVCs), virtual private networks (VPNs), and the like for providing data and voice communications. In one example, the service network 130 may be associated with the telecommunication service provider network 150. For example, the service network 130 may comprise one or more devices for providing services to subscribers, customers, and/or users. For example, telecommunication service provider network 150 may provide a cloud storage service, web server hosting, and other services. As such, service network 130 may represent aspects of telecommunication service provider network 150 where infrastructure for supporting such services may be deployed.

In one example, the service network 130 links one or more devices 131-134 with each other and with Internet 160, telecommunication service provider network 150, devices accessible via such other networks, such as endpoint devices 111-113 and 121-123, and so forth. In one example, devices 131-134 may each comprise a telephone for analog or digital telephony, a mobile device, a cellular smart phone, a laptop, a tablet computer, a desktop computer, a bank or cluster of such devices, and the like. In an example where the service network 130 is associated with the telecommunication service provider network 150, devices 131-134 of the service network 130 may comprise devices of network personnel, such as customer service agents, sales agents, marketing personnel, or other employees or representatives who are tasked with addressing customer-facing issues and/or personnel for network maintenance, network repair, construction planning, and so forth. Similarly, devices 131-134 of the service network 130 may comprise devices of network personnel responsible for operating and/or maintaining various data storage systems (e.g., database administrators).

In the example of FIG. 1, service network 130 may include one or more servers 135 which may each comprise all or a portion of a computing device or processing system, such as computing system 500, and/or a hardware processor element 502 as described in connection with FIG. 5 below, specifically configured to perform various steps, functions, and/or operations for identifying whether a first feature to be added to a feature graph database is a duplicate of a second feature in the feature graph database based at least upon a first feature ontology of the first feature and a second feature ontology of the second feature, as described herein. For example, one of the server(s) 135, or a plurality of servers 135 collectively, may perform operations in connection with the example method 400 of FIG. 4, or as otherwise described herein. Similarly, one or more of the server(s) 135 may represent a data consistency platform or processing system. In other words, one or more of the server(s) 135 may provide a data consistency service and/or a data element relationship identification service. Alternatively, or in addition, one or more of the server(s) 135, or one or more of the server(s) 135 in conjunction with one or more of DB(s) 136 may represent a feature store as described herein. In one example, server(s) 135 and/or DB(s) 136 may comprise cloud-based and/or distributed data storage and/or processing systems comprising one or more servers at a same location or at different locations. For instance, DB(s) 136, or DB(s) 136 in conjunction with one or more of the servers 135, may represent a distributed file system, e.g., a Hadoop® Distributed File System (HDFS™), or the like.

In addition, it should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device, or computing system, including one or more processors, or cores (e.g., as illustrated in FIG. 5 and discussed below) or multiple computing devices collectively configured to perform various steps, functions, and/or operations in accordance with the present disclosure.

In one example, the one or more databases (DBs) 136 may comprise data repositories comprising physical storage devices integrated with server(s) 135 (e.g., database servers), attached or coupled to the server(s) 135, and/or in remote communication with server(s) 135 to store various types of information in support of examples of the present disclosure for identifying whether a first feature to be added to a feature graph database is a duplicate of a second feature in the feature graph database based at least upon a first feature ontology of the first feature and a second feature ontology of the second feature. In one example, DB(s) 136 may store various features as part of a feature store, which can be used for various purposes, such as for training machine learning models, for applying as inputs to machine learning models for generating predictions, inferences, or the like, and so forth. The features may be stored as part of various data sets.

In one example, a data set may comprise one or more data tables having one or more columns and one or more rows (e.g., where the column(s) and row(s) may be referred to as data elements). As referred to herein, a "feature" may comprise a column of a data table. However, in some cases, a "feature" may comprise a vector of values (which may be considered as a single-column table). Each feature, whether part of a table or a standalone feature, may have a feature label, or feature name (e.g., a column title/header). In addition, each feature may have feature/column metadata comprising an ontology of the feature. In one example, the feature/column metadata for one or more features may also have lineage information and/or fingerprint information. The feature/column metadata may be stored in association with each feature/column (e.g., on a per feature/column basis) or may be stored as part of data set and/or data table metadata.

In some cases, feature data may be automatically uploaded to DB(s) 136 and/or retrieved by DB(s) 136 and/or server(s) 135 for storage in DB(s) 136. For instance, DB(s) 136 may maintain a data table comprising customer account records that may be updated on an ongoing basis as customer account information changes, and as such changes are recorded via various systems, such as via server(s) 155. Alternatively, or in addition, features may be uploaded to DB(s) 136 in accordance with a user input/request. For instance, network personnel may obtain permission to upload one or more $3^{rd}$ party data sets.

Figure 3:
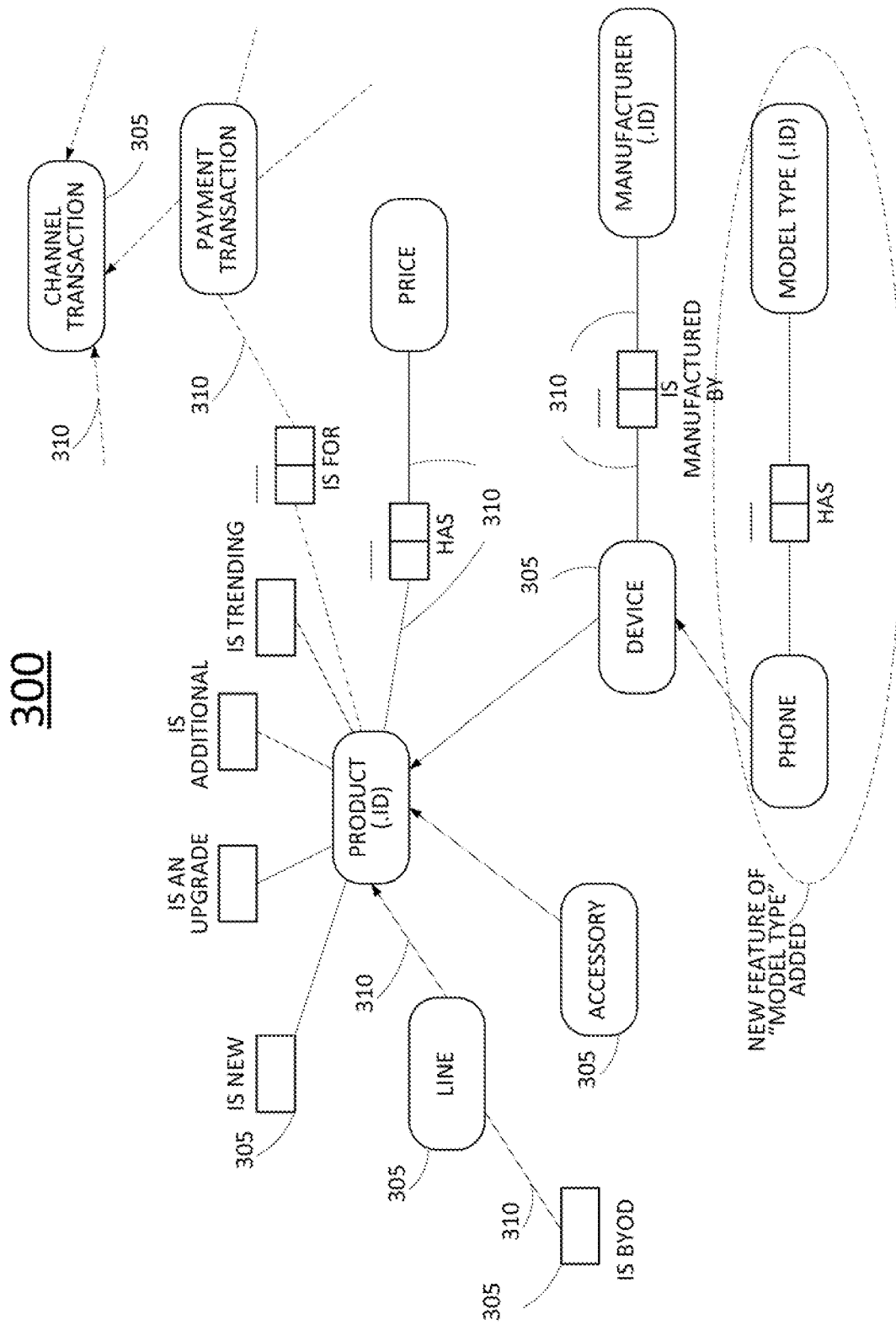
FIG. 3 illustrates an example feature graph, or feature graph database, in accordance with the present disclosure.

In one example DB(s) 136 may maintain a feature graph database, or "feature graph," which may comprise an ontology graph, or "ontological graph" in accordance with the present disclosure. Notably, the feature graph may maintain a view of the relationships of features available in the feature store to various concepts, as well as the relationships among features with each other. In one example, server(s) 135 may enable a search for features via ontological searches over the feature graph. An example feature graph is illustrated in FIG. 3 and described in greater detail below. It should be noted that the feature graph represents ontological relationships of features to concepts and among the features themselves at a feature level. One or more other graph databases may be used to represent the relationships among various network elements, relationships among users or other entities (e.g., a social graph), and so forth. In other words, the underlying data of various data sets and the relationships indicated by the underlying data may be reflected in other graph databases, which may alternatively or additionally be stored in DB(s) 136 or in another data storage system.

In view of the above, DB(s) 136 may be configured to receive and store network operational data collected from the telecommunication service provider network 150, such as call logs, mobile device location data, control plane signaling and/or session management messages, data traffic volume records, call detail records (CDRs), error reports, network impairment records, performance logs, alarm data, television usage information, such as live television viewing, on-demand viewing, etc., and other information and statistics. In accordance with the present disclosure, a data set may comprise a number of data elements selected from data of these data sources (e.g., at least a portion of the records from each of these data sources). For instance, in the case of mobile device location data, new location data is continuously collected by the telecommunication service provider network 150. This data may be added as new records to one or more data sets stored in DB(s) 136 on an ongoing basis, e.g., hourly, daily, etc. In addition old mobile device location data records may be released from DB(s) 136 on an ongoing basis and/or may be aggregated, averaged, etc., and stored as new data in DB(s) 136. In one example, a data set may comprise a data table that may have defined relationships to other data sets/data tables, which may have defined relationships among columns and/or rows of such data table, or which may have unknown/undefined relationships. In one example, relationships among data elements (e.g., table-to-table, column-to-column, etc.) may be learned via extract, transform, and load (ETL) processing and/or automated data profiling operations in accordance with the present disclosure, and added to the respective data element(s) and/or data set(s) as metadata (e.g., as part of a data element or data set "profile"). In one example, these relationships or aspects thereof may include lineage information that may be used for feature matching as described herein.

In one example, data from server(s) 155 may be further compiled and processed, e.g., normalized, transformed, tagged, etc. (e.g., ETL processing) for storage as further data elements within DB(s) 136. In one example, data elements (e.g., rows and/or columns) may be further organized into one or more data sets via an ETL process, such as in accordance with a system operator configuration that defines ownership and/or other associations of data elements to data sets. In one example, a data element may belong to more than one data set. In another example, a data element may be replicated such that different data sets have respective copies of the data element. In one example, network operational data may further include data and/or records collected from access networks 110 and 120 (e.g., where access networks 110 and 120 are a part of and/or controlled by telecommunication service provider network 150), such as from cellular base station equipment, data reported by and collected from endpoint devices 111-113 and 121-123, or the like, and so forth.

In one example, one or more features of one or more data sets of the data from server(s) 155 may be entered into a feature graph. In one example, network personnel may provide a feature ontology for a feature, which indicates how the feature is to be included in the feature graph. For instance, for each new feature, an "individual" or "object" (e.g., a node) may be added to the feature graph, where the feature ontology may indicate the relationships (e.g., edges) to be added for connecting the object to other nodes (e.g., classes/concepts and/or other individuals/objects). It should be noted that when a feature is added to the feature graph, it may become searchable and discoverable via an ontological search over the feature graph. In some cases, the underlying data for the feature may continue to be collected and added to a data set as new or changed data records. Thus, the data set may change as old data is removed from the data set, and so forth. In other cases, the feature and/or the data set containing the feature may be static or fixed at the time of adding to the feature graph. In other words, the feature and/or the data set may comprise "historical data." In any case, the feature graph may be used for feature discovery, where the feature graph may include a link for each feature to the storage location(s) where the actual feature data records may be stored (e.g., a part of a data set). Accordingly, the underlying data records of a feature may be retrieved separately when it may be determined that the feature is to be used, e.g., for machine learning model training and/or prediction, or other purposes.

In one example, DB(s) 136 may alternatively or additionally be configured to receive and store records from customer, user, and/or subscriber interactions, e.g., with customer facing automated systems and/or personnel of a telecommunication network service provider or other entities associated with the service network 130. For instance, DB(s) 136 may maintain call logs and information relating to customer communications which may be handled by customer agents via one or more of the devices 131-134. For instance, the communications may comprise voice calls, online chats, etc., and may be received by customer agents at devices 131-134 from one or more of devices 111-113, 121-123, etc. The records may include the times of such communications, the start and end times and/or durations of such communications, the touchpoints traversed in a customer service flow, results of customer surveys following such communications, any items or services purchased, the number of communications from each user, the type(s) of device(s) from which such communications are initiated, the phone number(s), IP address(es), etc. associated with the customer communications, the issue or issues for which each communication was made, etc. For instance, there may be different data elements comprising records of customers' voice calls, customers' text chats, and customers' online interactions, respectively, which may be associated with one or more data sets. Similar to the above, one or more features of one or more data sets associated with customer, user, and/or subscriber interactions may be represented in a feature graph, e.g., in accordance with feature ontologies indicating the relationships of such features to one or more classes/concepts and/or to other features (e.g., other individuals/objects).

Alternatively, or in addition, any one or more of the devices 131-134 may comprise an interactive voice response system (IVR) system, a web server providing automated customer service functions to subscribers, etc. In such case, DB(s) 136 may similarly maintain records of customer, user, and/or subscriber interactions with such automated systems (e.g., as one or more data sets, such as tables, or rows and/or columns within one or more tables). The records may be of the same or a similar nature as any records that may be stored regarding communications that are handled by a live agent. Similarly, any one or more of the devices 131-134 may comprise a device deployed at a retail location that may service live/in-person customers. In such case, the one or more of devices 131-134 may generate records that may be forwarded and stored by DB(s) 136. The records may comprise purchase data, information entered by employees regarding inventory, customer interactions, surveys responses, the nature of customer visits, etc., coupons, promotions, or discounts utilized, and so forth. In still another example, any one or more of the devices 111-113 or 121-123 may comprise a device deployed at a retail location that may service live/in-person customers and that may generate and forward customer interaction records to DB(s) 136. The records may be maintained as one or more data sets, such as data tables that contain records for different time blocks (e.g., different data tables for different days' records), data tables that contain records from different locations (e.g., a first table may store records from a first retail location, while a second table may store records from a second retail location, and so forth). As above, one or more features of the one or more data sets associated with automated customer, user, and/or subscriber interactions may be represented in a feature graph, e.g., in accordance with feature ontologies indicating the relationships of such features to one or more classes/concepts and/or to other features (e.g., other individuals/objects).

Thus, the various data and/or records collected from various components of telecommunication service provider network 150 (e.g., server(s) 155), access networks 110 and 120, and/or service network 130 may be organized into data elements (e.g., rows and/or columns). This includes both "streaming" and "batch" data, or both "data at rest" and "data in motion." In one example, the data elements may be collected as one or more "data sets" or may be assigned to/associated with one or more data sets as received. Alternatively, or in addition, data elements may be assigned to one or more data sets after being received at DB(s) 136.

In one example, DB(s) 136 may alternatively or additionally receive and/or store data from one or more external entities. For instance, DB(s) 136 may receive and store weather data or traffic data from a device of a third-party, e.g., a weather service, a traffic management service, etc. via one of the access networks 110 or 120. To illustrate, one of the endpoint devices 111-113 or 121-123 may represent a weather data server (WDS). In one example, the weather data may be received via a weather service data feed, e.g., an NWS extensible markup language (XML) data feed, or the like. In another example, the weather data may be obtained by retrieving the weather data from the WDS. In one example, DB(s) 136 may receive and store weather data from multiple third-parties. In still another example, one of the endpoint devices 111-113 or 121-123 may represent a server of a traffic management service and may forward various traffic related data to DB(s) 136, such as toll payment data, records of traffic volume estimates, traffic signal timing information, and so forth. Similarly, one of the endpoint devices 111-113 or 121-123 may represent a server of a bank, an insurance entity, a medical provider, a consumer credit entity (e.g., a credit bureau, a credit card company, etc.), a merchant, or the like. In such an example, DB(s) 136 may obtain one or more data sets comprising information such as: consumer credit scores, credit reports, purchasing information and/or credit card payment information, credit card usage location information, and so forth (e.g., as one or more data elements, such as tables, table columns, etc.). Alternatively, or in addition DB(s) 136 may receive the same or similar data as one or more data feeds, which may be organized into one or more data sets comprising one or more data tables to be stored by DB(s) 136. In one example, one of the endpoint devices 111-113 or 121-123 may represent a server of an online social network, an online gaming community, an online news service, a streaming media service, or the like. In such an example, DB(s) 136 may obtain one or more data sets/data feeds comprising information such as: connections among users, specific media or types of media accessed, the access times, the durations of media consumption, games played, durations of game play, and so forth. It should be noted that for all of the above examples, the data, records, or other information collected from external entities may also be organized into and referred to as "data elements." In one example, the data elements may be received as one or more "data sets," or may be assigned to one or more data sets after being received at DB(s) 136. As above, one or more features of one or more $3^{rd}$ party data sets may be represented in a feature graph, e.g., in accordance with feature ontologies indicating the relationships of such features to one or more classes/concepts and/or to other features (e.g., other individuals/objects).

In one example, network personnel or a $3^{rd}$ party may provide a feature ontology for a feature, which indicates how the feature is to be included in the feature graph. For instance, for each new feature, an "individual" or "object" (e.g. a node) may be added to the feature graph, where the feature ontology may indicate the relationships (e.g., edges) to be added for connecting the object to other nodes (e.g., classes/concepts and/or other individuals/objects). In one example, data sets and/or features may be stored in one or more other data repositories/storage systems, while DB(s) 136 may store and maintain a graph database that indicates the existence of various features and information to access the underlying data of the various features (e.g., links, such as uniform resource locators (URLs), application programming interface (API) calls, and so forth that are usable to retrieve the underlying feature data from one or more other data repositories/storage systems).

In accordance with the present disclosure, DB(s) 136 may further store metadata associated with various data sets and/or data elements, data schema(s) (e.g., for data formatting, data naming, data size, etc.), and so forth. In one example, the metadata may include profiles of data sets (which may include profiles or "fingerprints" of data elements of the data sets). For instance, a fingerprint/profile of a data element may comprise the characteristics thereof, such as for a data column: a data type of the column, a mean of the column values, a median, a standard deviation, a high value, a low value, a uniqueness metric, a Tversky index, and so forth. In accordance with the present disclosure, the fingerprint/profile may also include time information associated with a feature and/or a data set, such as the time range of the entries (e.g., records of all in-person retail transactions at a store within a 6 month time span, records of all server crashes in a particular data center within a 2 month time span, etc.) and/or a time interval represented by each entry (e.g., indications that records of a data set may comprise 30 second samples, 30 second averages, 5 minute samples, 5 minute average, etc.). In accordance with the present disclosure, the profile may further include lineage information, e.g., identifications of one or more related data elements (e.g., as determined in accordance with the present examples and/or as labeled by one or more users).

In one example, the metadata may also include feature ontologies for various feature, which for a given feature may define relationships of the feature to one or more concepts/classes and/or to one or more other features. In one example, the feature ontologies may additionally include "properties" of the feature. For instance, this may include a fingerprint/profile of the feature and/or other properties. However, in another example, when a feature is added to a feature graph, a feature ontology may be provided and the feature may be added to the feature graph accordingly (e.g., if not a duplicate). In such case, the feature ontology may be stored in connection with the feature and/or data set as metadata, or may simply be represented in the feature graph. In other words, in one example, it is not necessary to store the feature ontology as metadata along with the underlying feature data, since the feature ontology is stored in the structure of the feature graph itself.

In addition, with respect to all of the above examples, it should be noted that the data sets and/or data elements (e.g., features/columns and/or rows) of data sets may be accessed by server(s) 135 and/or DB(s) 136 via application programming interfaces (APIs) or other access mechanisms between computing systems, and may include data that is specifically formatted and/or processed so as to maintain user privacy and/or anonymity, and/or such that the data that is accessed is in accordance with user-granted permissions, preferences, or the like, as well as any applicable contractual, legal, and/or regulatory obligations of either the provider(s) of such data, and/or the operator of server(s) 135 and/or DB(s) 136, as an accessor of the data.

In one example, server(s) 135 may generate and/or maintain a feature graph, e.g., in DB(s) 136. For instance, as noted above nodes may represent features (e.g., "individuals" or "objects") and concepts/classes (and in one example, properties of features), and the edges may represent the relationships between the features and/or between features and classes (and in one example, between features and the respective feature properties). In view of the above, it should be noted that in one example, server(s) 135 may receive requests to add new features to the feature graph. In accordance with the present disclosure, server(s) 135 may perform a verification process that may ensure, inter alia, that a duplicate feature is not introduced into the feature graph, that a feature is added in a correct configuration in the feature graph, that feature names do not conflict, and so forth. To illustrate, server(s) 135 may obtain a request to add a first feature to a feature graph. For instance, the request may be received from personnel with authorized access to the feature graph, from one or more automated systems, and so forth. For instance, the request may be received from one of the devices 131-134. The request may relate to adding a plurality of features of a feature set to the feature graph, or may relate to just the first feature.

In accordance with the present disclosure, the first feature may have a first feature ontology. For instance, the first feature ontology may comprise at least one "triple" that includes a label of the first feature, the concept (or "class"), and a relationship of the first feature to a concept or to another feature. In one example, the relationship may define a relationship type (e.g., "is an example of", "has," "is manufactured by," etc., which may be set forth in a triple such as "feature 1 is an example of concept A," "Concept B has Feature 1," etc.). Server(s) 135 may then identify whether the first feature is a duplicate of a second feature in the feature graph database based at least upon the first feature ontology and a second feature ontology of the second feature. For instance, the first feature ontology may identify the concept, or the user may separately provide an indication of the "concept" to which the user believes the feature is most related. Server(s) 135 may then access the concept in the feature graph (if such concept is already contained in the feature graph) and may identify any connected features (e.g., features having relationships to the concept and/or features having two-hop connections to the concept, etc.). In one example, lineage information may also be provided or may be included in feature metadata along with the request. Accordingly, in one example, server(s) 135 may also access any features in the feature graph that may be identified in accordance with the lineage information. Alternatively, or in addition server(s) 135 may also identify and access any features in the feature graph that may have a same feature label/feature name as the first feature (e.g., even if not identified via the other methods above). For any existing features in the feature graph identified via any or all of such methods, server(s) 135 may then identify the feature ontologies of such features (e.g., including at least for the second feature). For instance, the feature ontologies may be implicit in the feature graph structure based on the edges/relationships. In one example, the edges/relationships may be labeled with a relationship type. As such, server(s) 135 may compare the feature ontologies of one or more existing features to the first feature ontology of the first feature that is to be added to the feature graph.

Server(s) 135 may then generate an indication of whether the first feature is a duplicate in response to the identifying. For instance, in the event that the first feature is determined to be an identical duplicate to the second feature, server(s) 135 may provide the indication that the first feature is a duplicate, e.g., to the requesting entity via one of the devices 131-134. In the event that the first feature is determined to be a same feature as the second feature but for a different time block and/or for partially overlapping time blocks, the indication may identify this determination. In one example, server(s) 135 may add the first feature to the feature graph, such as linked to the second feature with an edge/relationship indicating that the first feature is the same as the second feature but for a different time block.

Figure 4:
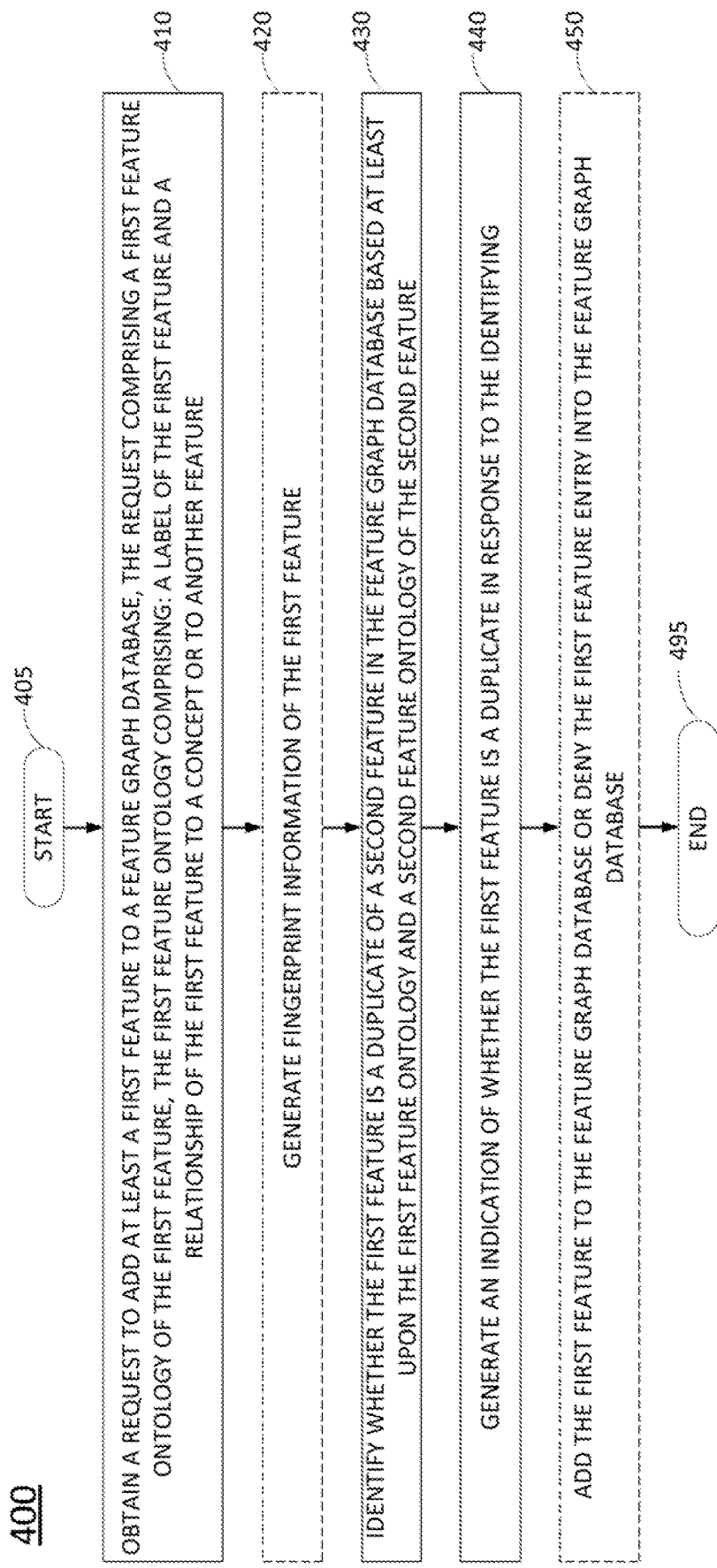
FIG. 4 illustrates a flowchart of an example method for identifying whether a first feature to be added to a feature graph database is a duplicate of a second feature in the feature graph database based at least upon a first feature ontology of the first feature and a second feature ontology of the second feature.

In one example, server(s) 135 may perform additional operations such as confirming that features are the same, and if so, whether the features are fully overlapping, partially overlapping, or disjoint in time (or whether features that appear to be the same are different) via further analysis. For example, server(s) 135 may compare fingerprints of the first feature and one or more existing features (e.g., including at least the second feature). For instance, the fingerprints, or profiles, may include statistical metrics, e.g., mean, median, high value, low value, entropy, uniqueness factor, etc. samples of the actual data contained therein, timing information, and so forth. Server(s) 135 may alternatively or additional perform various other operations as described herein. For instance, a flowchart of an example method 400 for identifying whether a first feature to be added to a feature graph database is a duplicate of a second feature in the feature graph database based at least upon a first feature ontology of the first feature and a second feature ontology of the second feature is illustrated in FIG. 4 described in greater detail below. In one example, server(s) 135 may perform such operations on an ongoing basis, e.g., as additional requests to add new features are received.

In addition, it should be realized that the system 100 may be implemented in a different form than that illustrated in FIG. 1, or may be expanded by including additional endpoint devices, access networks, network elements, application servers, etc. without altering the scope of the present disclosure. As just one example, any one or more of server(s) 135 and DB(s) 136 may be distributed at different locations, such as in or connected to access networks 110 and 120, in another service network connected to Internet 160 (e.g., a cloud computing provider), in telecommunication service provider network 150, and so forth. Thus, these and other modifications are all contemplated within the scope of the present disclosure.

To further aid in understanding the present disclosure, FIG. 2 illustrates an example of a feature set 200 to be added to a feature store, e.g., one having a searchable feature graph or feature graph database. For instance, the feature set 200 may be named "Sample Si" and may have several features. Each feature may have a feature name/label, a concept to which the feature relates, and a "recipe" (e.g., one or more triples, or "ingredients") comprising the feature ontology. For instance, the concepts and recipes may be provided by a user requesting to add the features of feature set 200 to a feature graph. In one example, the feature set 200 may also be provided with additional metadata (not shown), such as feature lineage and/or feature fingerprints (e.g., which may include timing information, statistical data of a feature, and/or other information). As noted above, the present disclosure may perform a feature duplicate check process prior to adding any features to the feature graph.

To further aid in understanding the present disclosure, and continuing with the present example, FIG. 3 illustrates an example feature graph 300 that may relate to the feature set 200 of FIG. 2. For instance, the request may be to add the features of feature set 200 of FIG. 2 to the feature graph 300 of FIG. 3. In the feature graph 300, there may be a plurality of nodes 305 and edges 310. For ease of illustration, only a few of the nodes 305 and edges 310 are specifically labeled. In one example, the feature graph 300 may represent a sub-graph of a larger feature graph. For instance, the feature graph 300 may illustrate the relevant nodes 305 and relationships/edges 310 related to the concept, or class of "product." The edges 310 represented by broken lines illustrate relationships which may connect to other parts of a larger feature graph. For instance, the node 305 for "channel transaction" may represent another concept/class within the larger feature graph. Similarly, the edges 310 that appear to be unconnected may in fact connect to other nodes in the larger graph that are omitted from illustration in FIG. 3. Some of the edges 310 include relationship labels, such as "is manufactured by" for an edge between nodes/objects "device" and "manufacturer." The line over the box may indicate a respective subject and predicate of the triple/ingredient (e.g., the node/object closer to the line is the subject and the other is the predicate of the triple).

It should also be noted that in accordance with the present disclosure, while some classes/concepts are purely conceptual, some classes/concepts may also comprise features within the feature store. Thus, in the feature graph 300 "product" or "product ID" may comprise both a "concept" and a "feature." For instance, a column of data comprising product IDs may be contained in a feature store represented by the feature graph 300. Additional nodes 305 may represent "properties" or "attributes" of features. For instance, "is new," "is an upgrade," "is additional," "is trending," etc. may be possible attributes of "product." Similarly, "is BYOD" may be a possible attribute of the feature "line."

Referring to the feature set 200 of FIG. 2, a first feature may comprise "Model Type" which may be identified as being associated with the concept of "Product" and having a recipe, or feature ontology of: "PhoneHasModelType" and "PhoneHasPrice." In one example, the present disclosure may identify existing features in the feature graph 300 that may be evaluated for determining whether the new feature of "Model Type" is already represented by an existing feature. For instance, in one example, the present disclosure may identify any existing features that have the same name/feature label (e.g., "Model Type"). In one example, the present disclosure may also identify existing features to evaluate based on the concept and recipe, or feature ontology of the first feature. For instance, for the feature of "Model Type" in the feature set 200, the concept of "Product" is identified. As such, the present disclosure may access the concept of "Product" in the feature graph 300. The present disclosure may then identify any features connected to this concept (e.g., one-hop relations, two-hop relations, etc.) that may identify the features' respective feature ontologies. For instance, there may be a feature of "Price" which has a feature ontology or recipe of "ProductHasPrice"

indicated by one of the edges 310. In addition, a feature of "manufacturer" has a feature ontology of "DevicesManufacturedByManufacturer."

Accordingly, the present disclosure may compare the recipe of "Model Type" in the feature set 200 to the respective recipes associated with different features in the feature graph 300 related to the same concept, or identified as having a same name/feature label. In one example, an exact ontological match may cause the present disclosure to flag the new feature as a potential duplicate. Similarly, when the feature ontology of the new feature differs from a feature ontology of an existing feature only by the name of the feature (e.g., as either the subject or predicate of a triple), the present disclosure may flag the new feature as a potential duplicate. In this case, the recipe for "Model Type" may be unique. In addition, there may be no existing feature called "Model Type." As such, the feature of "Model Type" may be added to the feature graph 300 in accordance with its recipe. This may include adding the node for "Phone" which also may not have been previously contained in the feature graph 300.

The next feature in the feature set 200 may have a label of "Manufacturer," a declared concept of "Product," and a recipe of "DevicesManufacturedByManufacturer." In this case, the present disclosure may identify any feature(s) of the same name that may already exist in the feature graph 300. In this case, there is already a node for "Manufacturer." In addition, the present disclosure may search for features that may have the same or similar recipe/feature ontology. In this case, the existing feature of "Manufacturer" may also be identified based on the recipe that may be extracted from the feature graph 300. In this case, there is an exact match between the recipe of the new feature and the existing feature. In addition, the feature names/labels are the same. Accordingly, the present disclosure may flag the new feature as an exact match and potentially duplicate.

Note that it is possible that there is an existing feature of "Manufacturer" having the same ontology but the underlying data may be different. For instance, the existing feature may comprise records from January and February, while the new feature may contain underlying data from March and April. In this case, the new feature should not be discarded, but should be stored in association with the existing feature. To identify this type of association, the present disclosure may further look to the feature profiles, or fingerprints of the new feature and the existing feature. For instance, when the fingerprints do not match with respect to the timing information, the present disclosure may generate an indication that the new feature appears to be the same feature, but a temporal complement to the existing feature. Accordingly, in one example, the new feature may be added to the feature graph 300 by including an additional link in the node data of the node 305 for "Manufacturer," e.g., links to retrieve the underlying data of the existing feature and the new feature from the feature set 200.

On the other hand, when the feature profiles are an exact match, or when the feature profiles may have a matching score above a threshold, the features may be considered to be the same. In other words, the new feature is a duplicate. The matching score may be a weighted score based on a similarity and/or difference between one or more aspects of the fingerprints, such as between respective mean values, high values, low values, uniqueness metrics, Tversky indexes, etc. In one example, the threshold may be different for different categories of underlying data records (e.g., binary, continuous numeric, categorical, string, etc.). In one example, a warning may be presented to a user. In addition, options may be provided to keep the existing feature, to replace the existing feature, to request that the feature graph 300 be updated to accommodate the new feature (e.g., a request escalated to a supervisory user with administrative privileges or the like), etc.

Still another new feature in the feature set 200 may have a feature name/label of "Billing Account Number" related to the concept of "Account" and having a recipe of "AccountHasBillingAccountNumber." Although the concept of "Account" is not contained in the feature graph 300 (e.g., a sub-graph), the concept may existing in a larger feature graph containing feature graph 300. Accordingly, for illustrative purposes it may be assumed that the present disclosure may access this concept and may identify an existing feature of "BAN." In addition, the existing feature may have a recipe of "AccountHasBAN." Comparing this to the recipe of the new feature "Billing Account Number," the recipes may differ only in the subject name, e.g., "Billing Account Number" versus "BAN." Accordingly, the present disclosure may continue to compare the respective profiles/fingerprints. For illustrative purposes, it may be assumed that the new feature has underlying data from a non-overlapping time range as the existing feature. As such, the new feature may be represented in the larger feature graph via a link to the underlying data, the link being associated with the existing node for the feature.

However, there is an inconsistency between the feature labels. In this case, the present disclosure may thus indicate that the feature name of the new feature will be changed for consistency, or may flag the feature for the user along with a request to rename the feature. Alternatively, the user may wish to represent the new feature as a separate node/object in the larger feature graph. For instance, the new feature may relate to a new special class of accounts that does not overlap with the existing accounts represented by the "BAN" feature (e.g., accounts for corporate sensor devices versus consumer cellular telephone services). In this case, the user may manually configure the addition of the new feature into the larger feature graph (if authorized) or may request another authorized user to do so on behalf of the user.

As yet another example, a new feature of "Price" may be contained in the feature set 200 and may be declared to be associated with the concepts of "Product" and "Payment." As in the preceding examples, the present disclosure may identify any feature(s) of the same name that may already exist in the feature graph 300. In this case, there is already a node for "Price." In addition, the present disclosure may search for features in the feature graph 300 that may have the same or similar recipe/feature ontology. In this case, the concept of "Product" has a number of related features, one of which is "Price." In addition, the recipe for the existing feature of "Price" is "ProductHasPrice." In this case, the recipe for the new feature of "Price" in the feature set 200 differs from the recipe for "Price" in only the subject name. In one example, this may be flagged for potential conflict resolution by a user. Alternatively, or in addition, the present disclosure may continue to compare the fingerprints/profiles of the existing feature and the new feature to detect the same or overlapping data. In this case, the fingerprints may be the same (or may have a similarity score that exceeds a threshold). As such, it may appear that the new feature and the existing feature are the same. In one example, a user may be notified that the new feature is a likely duplicate and will not be entered into the feature store.

Alternatively, or in addition, the user may be informed that the recipe of the new feature appears to be incorrect and that it does not conform to the existing ontology of the feature graph 300. It should be noted that an ontological graph, such as feature graph 300, may be arranged in various subjective ways. Thus, the fact that a recipe of a new feature does not match an existing recipe reflected in the ontology of the feature graph does not mean that it is incorrect. Rather, it merely reflects a difference of opinion in terms of how relationships among different features, and between features and concepts should be represented. In any case, in one example, the present disclosure may assume that recipes/ feature ontologies of existing features are correct and may prevent inclusion of new features in the feature graph 300 that would conflict with the organization, e.g., the ontology, of the existing feature graph 300. It should be noted that the ontology of the feature graph 300 may be changed to accommodate ontologies of new features that may conflict with an existing ontology, such as by a supervisory user. For example, the new feature may be the same as an existing feature, but may contain underlying data from a subsequent time period. In addition, the recipes/feature ontologies may be different. However, the recipe for the new feature may be preferred by a user to the recipe for the existing features. Thus, it may be requested to use the recipe of the new feature, and to change the recipe of the old feature to conform with the new recipe/feature ontology instead. As such, it should be noted that these and other modifications are all contemplated within the scope of the present disclosure.

FIG. 4 illustrates a flowchart of an example method 400 for identifying whether a first feature to be added to a feature graph database is a duplicate of a second feature in the feature graph database based at least upon a first feature ontology of the first feature and a second feature ontology of the second feature, according to the present disclosure. In one example, the method 400 is performed by a component of the system 100 of FIG. 1, such as by server(s) 135, and/or any one or more components thereof (e.g., a processor, or processors, performing operations stored in and loaded from a memory or distributed memory system), or by server(s) 135, in conjunction with one or more other devices, such as DB(s) 136, server(s) 155, and so forth. In one example, the steps, functions, or operations of method 400 may be performed by a computing device or processing system, such as computing system 500 and/or a hardware processor element 502 as described in connection with FIG. 5 below. For instance, the computing system 500 may represent at least a portion of a platform, a server, a system, and so forth, in accordance with the present disclosure. In one example, the steps, functions, or operations of method 400 may be performed by a processing system comprising a plurality of such computing devices as represented by the computing system 500. For illustrative purposes, the method 400 is described in greater detail below in connection with an example performed by a processing system (e.g., deployed in a telecommunication network). The method 400 begins in step 405 and proceeds to step 410.

At step 410, the processing system obtains a request to add at least a first feature to a feature graph database. For instance, the request may be received from an endpoint device of a requesting user, from an automated system, etc. In one example, the request may comprise a first feature ontology of the first feature. For instance, the first feature ontology may comprise a label of the first feature and a relationship of the first feature to one of: a concept or another feature (e.g., at least one "triple," or a "recipe" which may comprise at least one "ingredient"). In one example, the request may include a feature label, or a feature name of the first feature. In one example, step 410 may further include obtaining lineage information of the at least the first feature. For instance, lineage information may optionally be provided as part of the request. Alternatively, or in addition, step 410 may further comprise requesting a user to provide lineage information, and obtaining the lineage information, e.g., from a device of the user. In one example, step 410 may also include obtaining a first fingerprint, or profile, of the first feature (e.g., as part of or in connection with the request).

At optional step 420, the processing system may generate fingerprint information of the at least the first feature. For instance, if the fingerprint information is not provided as part of the request, the processing system may analyze the underlying data records of the first feature to generate one or more statistical metrics, such as a high value, low value, median value, mean value, a uniqueness metric, an entropy metric, a Tversky index, etc. In one example, the fingerprint information may alternatively or additionally comprise timing information of the first feature, such as a time range covered by the underlying data records of the first feature, and/or a time interval represented by each data record/entry (for instance, each record may comprise a 30 second sample, a 30 second average, a 5 minute sample, a 5 minute average, or the like).

At step 430, the processing system identifies whether the first feature is a duplicate of a second feature (e.g., an existing feature) in the feature graph database based at least upon the first feature ontology and a second feature ontology of the second feature. For instance, in one example, step 430 may comprise identifying that the second feature ontology is the same as the first feature ontology. In another example, step 430 may comprise identifying that the second feature ontology is different from the first feature ontology. In still another example, step 430 may comprise identifying that the second feature ontology is similar to the first feature ontology. For instance, "similar" may be defined as differing in only one aspect between the feature ontologies (e.g., one of: a different feature name, a different relationship label, or a different related object).

In one example, step 430 may comprise accessing the concept in the feature graph (if such concept is already contained in the feature graph) and identifying any connected features (e.g., features having relationships to the concept, and/or features that have two-hop connections to the concept, etc.). In one example, step 430 may also comprise accessing any features that may be in the feature graph database that may be identified in accordance with lineage information that may optionally be received at step 410. For example, lineage information may indicate that the first feature is derived from feature X. Thus, feature X and any other features already in the feature graph database that are also known to be derived from feature X or otherwise related to feature X may be accessed. Alternatively, or in addition step 430 may comprise identifying and accessing any features in the feature graph database that may have a same feature label/feature name as the first feature (e.g., even if not identified via the other methods above).

For any existing features in the feature graph database identified via any or all of such methods, the processing system may then identify the feature ontologies of such features (e.g., including at least for the second feature). For instance, the feature ontologies may be implicit in the feature graph database structure based on the edges/relationships. In one example, the edges/relationships may be labeled with a relationship type. As such, step 430 may include comparing the feature ontologies (or "recipes") of one or more existing features to the first feature ontology (or "recipe") of the first feature that is to be added to the feature graph database.

In one example, step 430 may comprise identifying one of several alternatives: (A) the first feature and second feature have the same label/name and same feature ontology, (B) the first feature and second feature have the same label/name and different feature ontologies, (C) the first feature and second feature have different labels/names and a same or similar feature ontology, and (D) the first feature and second feature have different labels/names and different feature ontologies.

In one example, the result (A) may indicate that the first feature is a potential duplicate of the second feature, the result (B) may indicate that the first feature and the second feature are different, the result (C) may indicate that the first feature is a potential duplicate of the second feature, and the result (D) may indicate that the first feature and the second feature are different. In one example, step 430 may further comprise determining whether fingerprint information of the first feature matches fingerprint information of the second feature. For instance, this may be performed following a determination of (A), (B), or (C). To illustrate, with respect to (A), if the first feature and second feature have the same label/name and same feature ontology, a comparison of the fingerprint information/profiles of the first feature and the second feature may confirm that the first feature is a duplicate, may reveal that the first feature may be from a non-overlapping and/or partially overlapping time block as compared to the second feature, or may contraindicate that the first feature appears to be different from the second feature. For instance, as noted above, the fingerprint information of the first feature may include timing information of the underlying data records of the first feature and/or at least one statistical metric of the underlying data records of the first feature (and similarly for the fingerprint information of the second feature).

In one example, when the timing information is different, the processing system may identify that the first feature is the same as the second feature, but for a different time period. In one example, if the timing information is the same, a matching score may then be calculated as a weighted score based on a similarity and/or difference between one or more aspects of the fingerprint information, such as between respective mean values, high values, low values, uniqueness metrics, Tversky indexes, etc. In one example, when the matching score exceeds a threshold, the processing system may confirm that the first feature is a duplicate of the second feature. On the other hand, when the matching score does not exceed a threshold, the processing system may reach an inconclusive determination. In other words, the label and feature ontology matching is in contrast to the respective fingerprint information being different.

Similarly, with respect to (B), if the first feature and the second feature have the same name/label and different ontologies, the processing system may determine whether the timing information matches and may calculate a matching score of the fingerprint information. If the matching score of the fingerprint information does not exceed the threshold and the timing information is the same, the processing system may reach a conclusion that the first feature and the second feature are different (and that the first feature should be renamed/relabeled to avoid confusion). If the matching score of the fingerprint information does not exceed the threshold and the timing information is different, the processing system may reach an inconclusive determination. In other words, it is unclear if the first feature and second features are different, or whether the first feature and the second feature are the same but are just for different time blocks. However, if the first feature and the second feature have the same name/label and different ontologies, and if the matching score of the fingerprint information exceeds the threshold, the processing system may conclude that the features are the same, but the ontologies are inconsistent (and additionally, that the first feature is a duplicate of the second feature and should not be added to the feature graph database).

With respect to (C), a matching score may be calculated. When the timing information is the same and the matching score exceeds a threshold, the processing system may confirm that the first feature is a duplicate of the second feature. On the other hand, when the matching score does not exceed the threshold and the timing information is the same, the processing system may reach a determination that the first feature and the second feature are different. When the matching score does not exceed the threshold and the timing information is different, the processing system may reach an inconclusive determination.

At step 440, the processing system generates an indication of whether the first feature is a duplicate in response to the identifying. For instance, the indication may be in accordance with the determination at step 430. In one example, the indication may be provided to a user device of a user submitting the request that is obtained at step 410 or to an automated system submitting the request. In one example, the indication may further include at least one of, depending upon the determination at step 430: an indication that the first feature is to be added to the feature graph database, an indication that the first feature is not to be added to the feature graph database (e.g., it is a duplicate), an indication that the determination of step 430 is inconclusive, etc. In the event that the indication is "inconclusive," in one example, step 440 may include requesting a resolution of the apparent discrepancy between the first feature and the second feature (e.g., from a user). For instance, this may include renaming one of the two features, changing the feature ontology for the first feature, changing the feature ontology of the second feature (in one example, this option may be restricted to only certain authorized users), and so forth.

At optional step 450, the processing system may add the first feature to the feature graph database or deny the first feature entry into the feature graph database. In an example in which the first feature is a unique new feature, the first feature may be added as a new node, e.g., an individual or object in the feature graph database, and one or more new relationships/edges may be added in accordance with the first feature ontology. In the event that the first feature is the same as the second feature but from a non-overlapping or partially overlapping time block, the first feature may be added to the feature graph database by way of the addition of a link to the first feature within the node information of the node that is already contained in the feature graph database for the second feature. For instance, this node may similarly include a link that identifies and enables access of the underlying data of the second feature.

Following step 440 or optional step 450, the method 400 proceeds to step 495 where the method 400 ends.

It should be noted that the method 400 may be expanded to include additional steps, or may be modified to replace steps with different steps, to combine steps, to omit steps, to perform steps in a different order, and so forth. For instance, in one example the processing system may repeat one or more steps of the method 400, such as steps 410-440 or steps 410-450 for one or more additional features within a same data set or a different data set from the first feature. In one example, the method 400 may comprise first performing one or more aspects of step 430, and if it appears that the first feature and the second feature may have a same or similar ontology and/or may have a same feature name, then performing operations of optional step 420 to generate the first fingerprint. In one example, optional step 420 may further include, or a separate step of the method 400 may comprise storing the first fingerprint. In this regard, it should be noted that the second fingerprint may be generated and stored as metadata of the second feature (e.g., as part of or linked to the underlying data records and/or a data set containing the second feature when the second feature was added to the feature graph database, and so on for various other features already included in the feature graph database). In one example, the method 400 may further include a step of obtaining the underlying data records of the first feature, e.g., for calculating the fingerprint information at optional step 420. In one example, the method 400 may include training a detection model, e.g., a machine learning model, such as a support vector machine (SVM), a decision tree-base classifier, a KNN predictive classifier, or the like for outputting a matching score for the first fingerprint information and the second fingerprint information (e.g. as an alternative or in addition to a formula-based comparison in which weights for various aspects of the fingerprint information may be manually selected).

In one example, the method 400 may further include obtaining an ontological search request and returning a result set comprising one or more features identified from the feature graph database in accordance with the ontological search request. For instance, a user may enter search terms such as "fraud" and "phone X," and may obtain multiple features related to these terms. The user can select one or more of these features (e.g., column or columns), can select a time range or time ranges for which the feature(s) (e.g., column(s)) is/are desired, can download the underlying data records from the feature store, can join to data that is possessed/stored locally, and so forth. In addition, the user may use the newly added feature(s) to train/retrain one or more machine learning models or the like, or may use the newly added feature(s) as additional input(s) to such model(s) to obtain additional/different insights, a possible boost in the performance of the one or more models, and so on. In one example, the method 400 may be expanded or modified to include steps, functions, and/or operations, or other features described above in connection with the example(s) of FIGS. 1-3, or as described elsewhere herein. Thus, these and other modifications are all contemplated within the scope of the present disclosure.

In addition, although not expressly specified above, one or more steps of the method 400 may include a storing, displaying and/or outputting step as required for a particular application. In other words, any data, records, fields, and/or intermediate results discussed in the method can be stored, displayed and/or outputted to another device as required for a particular application. Furthermore, operations, steps, or blocks in FIG. 4 that recite a determining operation or involve a decision do not necessarily require that both branches of the determining operation be practiced. In other words, one of the branches of the determining operation can be deemed as an optional step. However, the use of the term "optional step" is intended to only reflect different variations of a particular illustrative embodiment and is not intended to indicate that steps not labelled as optional steps to be deemed to be essential steps. Furthermore, operations, steps or blocks of the above described method(s) can be combined, separated, and/or performed in a different order from that described above, without departing from the example embodiments of the present disclosure.

Figure 5:
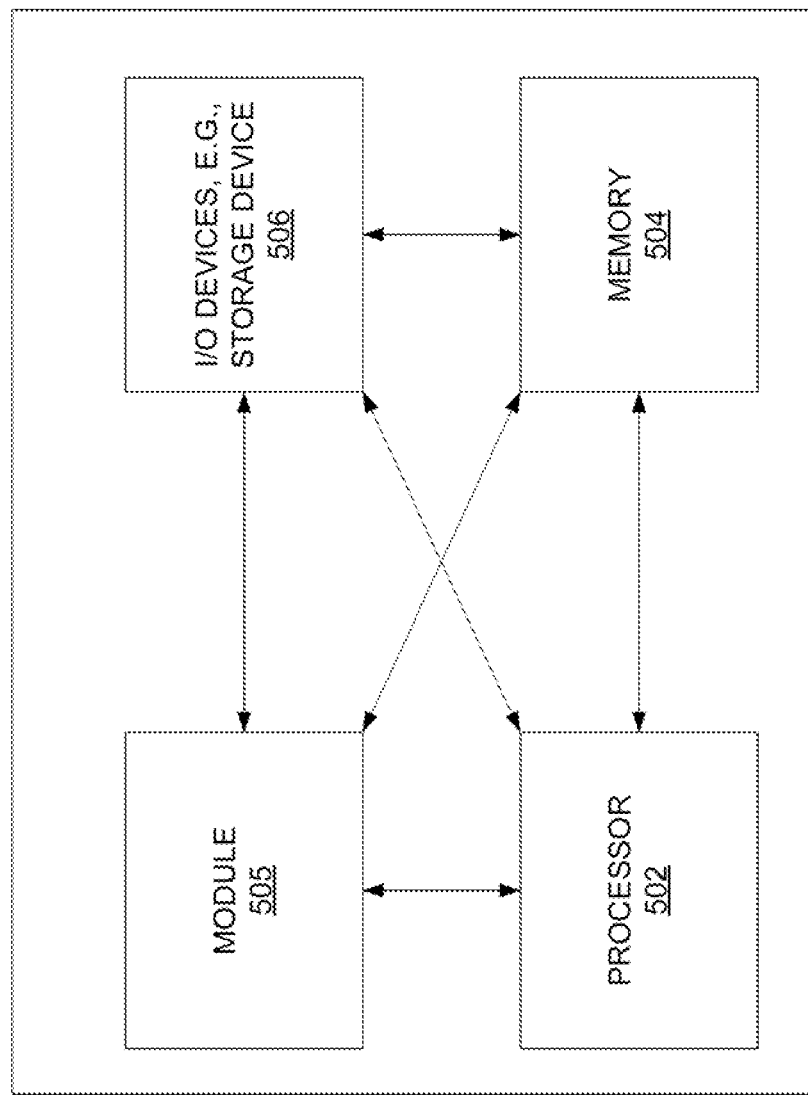
FIG. 5 illustrates a high-level block diagram of a computing device specially programmed to perform the functions described herein.

FIG. 5 depicts a high-level block diagram of a computing system 500 (e.g., a computing device or processing system) specifically programmed to perform the functions described herein. For example, any one or more components, devices, and/or systems illustrated in FIG. 1, or described in connection with FIGS. 2-4, may be implemented as the computing system 500. As depicted in FIG. 5, the computing system 500 comprises a hardware processor element 502 (e.g., comprising one or more hardware processors, which may include one or more microprocessor(s), one or more central processing units (CPUs), and/or the like, where the hardware processor element 502 may also represent one example of a "processing system" as referred to herein), a memory 504, (e.g., random access memory (RAM), read only memory (ROM), a disk drive, an optical drive, a magnetic drive, and/or a Universal Serial Bus (USB) drive), a module 505 for identifying whether a first feature to be added to a feature graph database is a duplicate of a second feature in the feature graph database based at least upon a first feature ontology of the first feature and a second feature ontology of the second feature, and various input/output devices 506, e.g., a camera, a video camera, storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like).

Although only one hardware processor element 502 is shown, the computing system 500 may employ a plurality of hardware processor elements. Furthermore, although only one computing device is shown in FIG. 5, if the method(s) as discussed above is implemented in a distributed or parallel manner for a particular illustrative example, e.g., the steps of the above method(s) or the entire method(s) are implemented across multiple or parallel computing devices, then the computing system 500 of FIG. 5 may represent each of those multiple or parallel computing devices. Furthermore, one or more hardware processor elements (e.g., hardware processor element 502) can be utilized in supporting a virtualized or shared computing environment. The virtualized computing environment may support one or more virtual machines which may be configured to operate as computers, servers, or other computing devices. In such virtualized virtual machines, hardware components such as hardware processors and computer-readable storage devices may be virtualized or logically represented. The hardware processor element 502 can also be configured or programmed to cause other devices to perform one or more operations as discussed above. In other words, the hardware processor element 502 may serve the function of a central controller directing other devices to perform the one or more operations as discussed above.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computing device, or any other hardware equivalents, e.g., computer-readable instructions pertaining to the method(s) discussed above can be used to configure one or more hardware processor elements to perform the steps, functions and/or operations of the above disclosed method(s). In one example, instructions and data for the present module 505 for identifying whether a first feature to be added to a feature graph database is a duplicate of a second feature in the feature graph database based at least upon a first feature ontology of the first feature and a second feature ontology of the second feature (e.g., a software program comprising computer-executable instructions) can be loaded into memory 504 and executed by hardware processor element 502 to implement the steps, functions or operations as discussed above in connection with the example method(s). Furthermore, when a hardware processor element executes instructions to perform operations, this could include the hardware processor element performing the operations directly and/or facilitating, directing, or cooperating with one or more additional hardware devices or components (e.g., a co-processor and the like) to perform the operations.

The processor (e.g., hardware processor element 502) executing the computer-readable instructions relating to the above described method(s) can be perceived as a programmed processor or a specialized processor. As such, the present module 505 for identifying whether a first feature to be added to a feature graph database is a duplicate of a second feature in the feature graph database based at least upon a first feature ontology of the first feature and a second feature ontology of the second feature (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium may comprise a physical device, a hardware device, or a device that is discernible by the touch. More specifically, the computer-readable storage device or medium may comprise any physical devices that provide the ability to store information such as instructions and/or data to be accessed by a processor or a computing device such as a computer or an application server.

While various examples have been described above, it should be understood that they have been presented by way of example only, and not limitation. Thus, the breadth and scope of a preferred example should not be limited by any of the above-described examples, but should be defined only in accordance with the following claims and their equivalents.

What is claimed is:

1. A method comprising:
obtaining, by a processing system including at least one processor, a request to add at least a first feature to a feature graph database, wherein the feature graph database represents one or more data tables, where each of the one or more data tables comprises a plurality of rows and a plurality of columns, wherein the first feature comprises a first data column, wherein the first data column comprises a vector of values, wherein the request comprises a first feature ontology of the first feature, wherein the first feature ontology comprises: a label of the first feature and a relationship of the first feature to another feature, wherein the feature graph database comprises:
a plurality of objects, each of the plurality of objects associated with a feature of a plurality of features, wherein each of the plurality of features comprises a column of a data table of the one or more data tables; and
a plurality of relationships between the plurality of objects, and wherein the obtaining includes obtaining lineage information of the first feature, wherein the lineage information identifies a derivation of the first feature from another feature;
identifying, by the processing system, whether the first feature is a duplicate of a second feature in the feature graph database based at least upon the first feature ontology and a second feature ontology of the second feature, wherein the identifying comprises identifying whether the second feature ontology is similar to the first feature ontology according to a similarity definition, wherein the identifying is further based on fingerprint information of the first feature, wherein the fingerprint information comprises a first vector including a plurality of statistical metrics of underlying data records of the first feature, wherein the identifying further comprises calculating a distance metric between the first vector and a second vector including a plurality of statistical metrics associated with the second feature, wherein the fingerprint information further comprises: timing information of the underlying data records of the first feature, wherein the timing information comprises respective time intervals represented by the underlying data records of the first feature, and wherein the identifying is further based on the lineage information; and
generating, by the processing system, an indication of whether the first feature is a duplicate in response to the identifying.

2. The method of claim 1, wherein the obtaining includes obtaining the fingerprint information of the first feature.

3. The method of claim 1, further comprising:
generating the fingerprint information of the first feature.

4. The method of claim 1, wherein the identifying comprises:
identifying that the first feature and the second feature have a same feature label.

5. The method of claim 4, wherein the identifying comprises:
identifying that the second feature ontology is the same as the first feature ontology, wherein the indication comprises an indication that the first feature is the same as the second feature.

6. The method of claim 5, wherein the identifying further comprises:
determining whether the fingerprint information of the first feature matches fingerprint information of the second feature in accordance with the distance metric.

7. The method of claim 6, wherein the indication comprises an indication that the first feature is the same as an existing feature, when it is determined that the fingerprint information of the first feature matches the fingerprint information of the second feature.

8. The method of claim 6, wherein the indication comprises an indication that the first feature is different from an existing feature, when it is determined that the fingerprint information of the first feature does not match the fingerprint information of the second feature.

9. The method of claim 4, wherein the identifying comprises:
identifying that the second feature ontology is different from the first feature ontology, wherein the indication comprises an indication that the first feature is different from the second feature.

10. The method of claim 1, wherein the identifying comprises:
identifying that the second feature ontology is similar to the first feature ontology.

11. A non-transitory computer-readable medium storing instructions which, when executed by a processing system including at least one processor, cause the processing system to perform operations, the operations comprising:

obtaining a request to add at least a first feature to a feature graph database, wherein the feature graph database represents one or more data tables, where each of the one or more data tables comprises a plurality of rows and a plurality of columns, wherein the first feature comprises a first data column, wherein the first data column comprises a vector of values, wherein the request comprises a first feature ontology of the first feature, wherein the first feature ontology comprises: a label of the first feature and a relationship of the first feature to another feature, wherein the feature graph database comprises:

a plurality of objects, each of the plurality of objects associated with a feature of a plurality of features, wherein each of the plurality of features comprises a column of a data table of the one or more data tables; er a concept; and a plurality of relationships between the plurality of objects, and wherein the obtaining includes obtaining lineage information of the first feature, wherein the lineage information identifies a derivation of the first feature from another feature;

identifying whether the first feature is a duplicate of a second feature in the feature graph database based at least upon the first feature ontology and a second feature ontology of the second feature, wherein the identifying comprises identifying whether the second feature ontology is similar to the first feature ontology according to a similarity definition, wherein the identifying is further based on fingerprint information of the first feature, wherein the fingerprint information comprises a first vector including a plurality of statistical metrics of underlying data records of the first feature, wherein the identifying further comprises calculating a distance metric between the first vector and a second vector including a plurality of statistical metrics associated with the second feature, wherein the fingerprint information further comprises: timing information of the underlying data records of the first feature, wherein the timing information comprises respective time intervals represented by the underlying data records of the first feature, and wherein the identifying is further based on the lineage information; and generating an indication of whether the first feature is a duplicate in response to the identifying.

12. The non-transitory computer-readable medium of claim 11, wherein the obtaining includes obtaining the fingerprint information of the first feature.

13. A device comprising:

a processor system including at least one processor; and a computer-readable medium storing instructions which, when executed by the processing system, cause the processing system to perform operations, the operations comprising:

obtaining a request to add at least a first feature to a feature graph database, wherein the feature graph database represents one or more data tables, where each of the one or more data tables comprises a plurality of rows and a plurality of columns, wherein the first feature comprises a first data column, wherein the first data column comprises a vector of values, wherein the request comprises a first feature ontology of the first feature, wherein the first feature ontology comprises: a label of the first feature and a relationship of the first feature to another feature, wherein the feature graph database comprises:

a plurality of objects, each of the plurality of objects associated with a feature of a plurality of features, wherein each of the plurality of features comprises a column of a data table of the one or more data tables; and a plurality of relationships between the plurality of objects, and wherein the obtaining includes obtaining lineage information of the first feature, wherein the lineage information identifies a derivation of the first feature from another feature;

identifying whether the first feature is a duplicate of a second feature in the feature graph database based at least upon the first feature ontology and a second feature ontology of the second feature, wherein the identifying comprises identifying whether the second feature ontology is similar to the first feature ontology according to a similarity definition, wherein the identifying is further based on fingerprint information of the first feature, wherein the fingerprint information comprises a first vector including a plurality of statistical metrics of underlying data records of the first feature, wherein the identifying further comprises calculating a distance metric between the first vector and a second vector including a plurality of statistical metrics associated with the second feature, wherein the fingerprint information further comprises: timing information of the underlying data records of the first feature, wherein the timing information comprises respective time intervals represented by the underlying data records of the first feature, and wherein the identifying is further based on the lineage information; and generating an indication of whether the first feature is a duplicate in response to the identifying.

14. The device of claim 13, wherein the obtaining includes obtaining the fingerprint information of the first feature.

15. The device of claim 13, wherein the operations further comprise:

generating the fingerprint information of the first feature.

16. The device of claim 13, wherein the identifying comprises:

identifying that the first feature and the second feature have a same feature label.

17. The device of claim 16, wherein the identifying comprises:

identifying that the second feature ontology is the same as the first feature ontology, wherein the indication comprises an indication that the first feature is the same as the second feature.

18. The device of claim 16, wherein the identifying comprises:

identifying that the second feature ontology is different from the first feature ontology, wherein the indication comprises an indication that the first feature is different from the second feature.

19. The device of claim 13, wherein the identifying comprises:

identifying that the second feature ontology is similar to the first feature ontology.

* * * * *